United States Patent

[11] 3,624,774

| | | |
|---|---|---|
| [72] | Inventor | James W. Marietta, Jr.<br>c/o D-Mar Co., 1116 West 24th St., Los Angeles, Calif. 90007 |
| [21] | Appl. No. | 10,892 |
| [22] | Filed | Feb. 12, 1970 |
| [45] | Patented | Nov. 30, 1971 |

[54] SAUSAGE SMOKING APPARATUS
8 Claims, 14 Drawing Figs.

[52] U.S. Cl. .................................. 198/158, 198/203, 312/268
[51] Int. Cl. ............................................ B65g 17/16
[50] Field of Search ........................ 198/131, 20, 19, 37, 140, 148, 154, 158; 186/1 B; 214/16.4; 99/109; 312/268; 221/194

[56] References Cited
UNITED STATES PATENTS
2,905,517  9/1959  Mead ......................... 312/268
582,004   5/1897  Szczys ......................... 312/268

*Primary Examiner*—Evon C. Blunk
*Assistant Examiner*—Alfred N. Goodman
*Attorney*—Georges A. Maxwell ABSTRACT: A means and apparatus for handling sausages from a sausage-stuffing station and throughout a cooking period; said means and apparatus including an inclined ramp at said station and down which sausages roll, a wheeled truck-supported rack in cooperative relationship with the ramp and having a plurality of horizontal sausage-receiving baskets carried in spaced relationship on endless chains and automatically operated drive means to rotate the chain-supported baskets to move each basket from sausage-receiving relationship with the ramp each time a sausage is deposited into a basket and to move the next adjacent basket into sausage-receiving relationship with the ramp. The rack is movable from said station and ramp and into a cooking area to cook the sausages in the baskets.

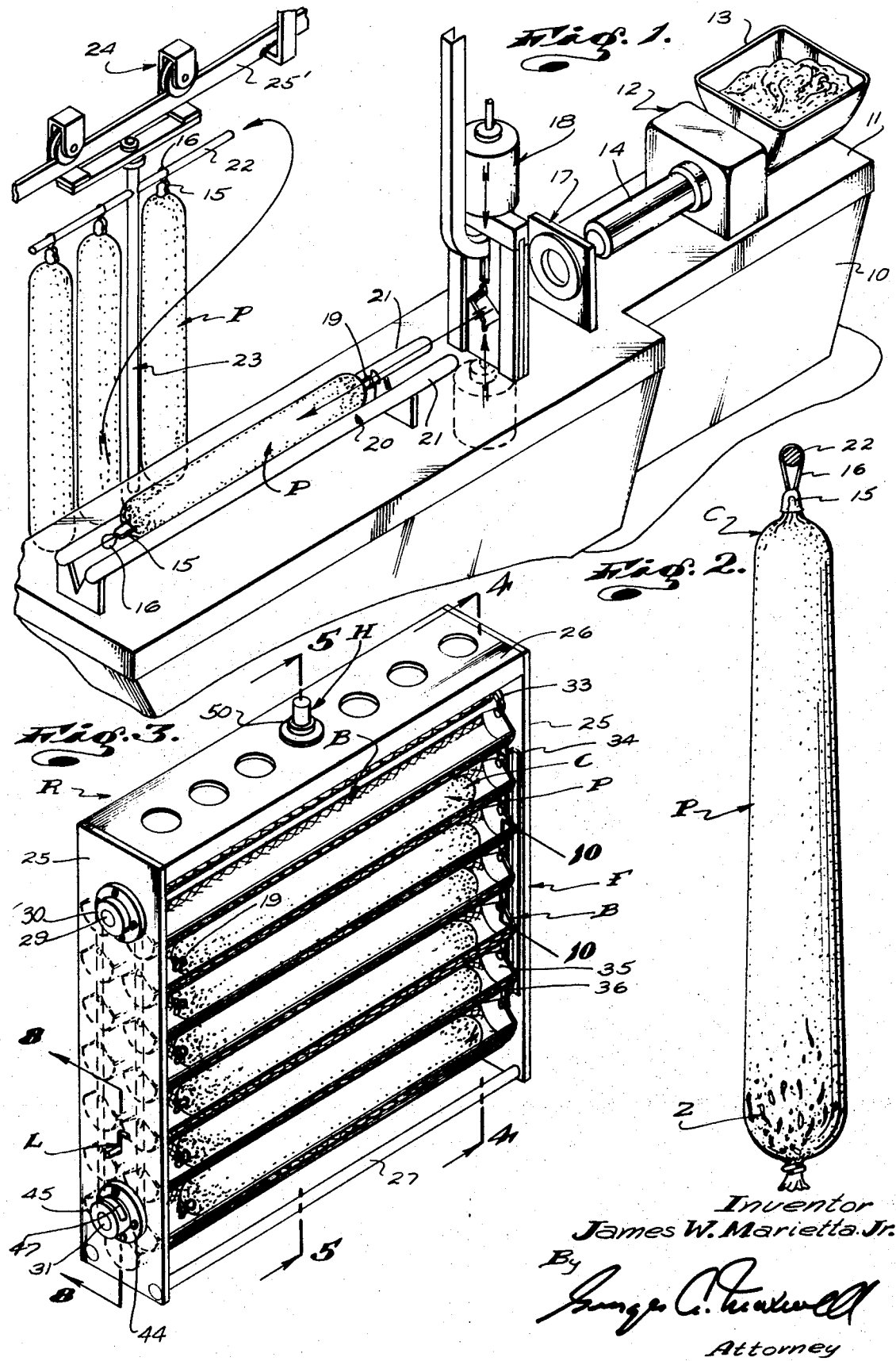

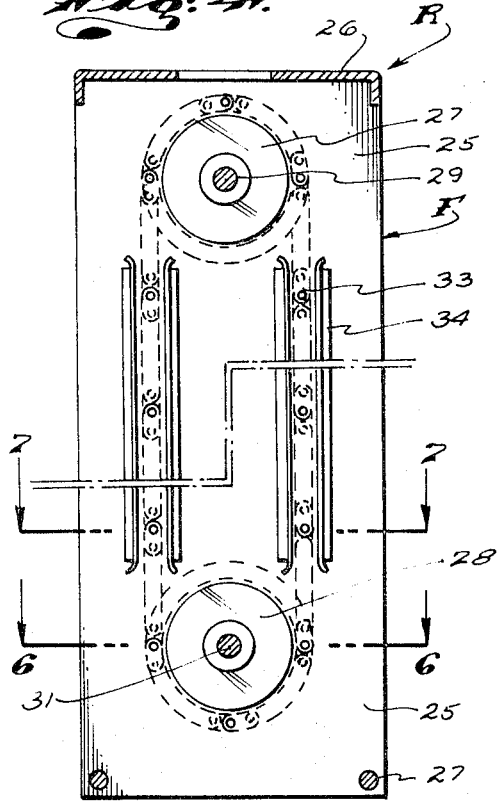
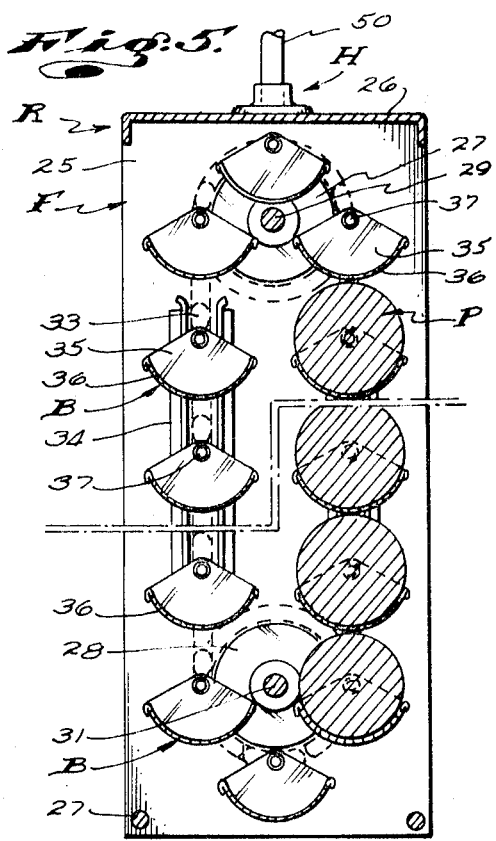
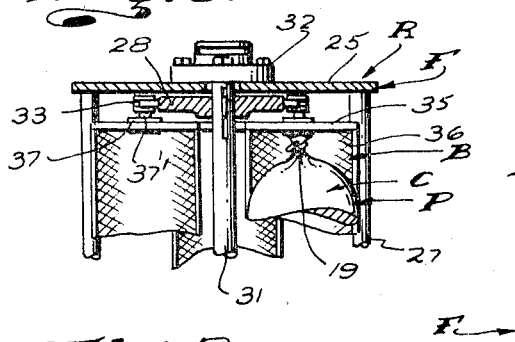
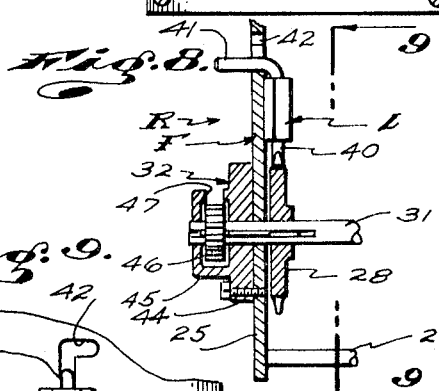
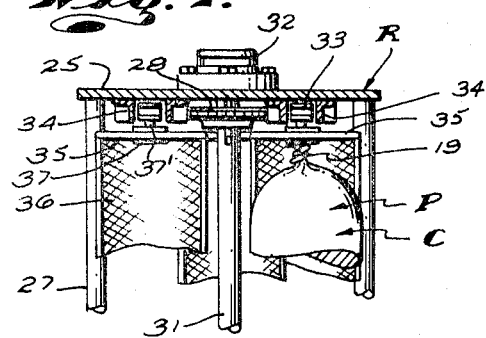
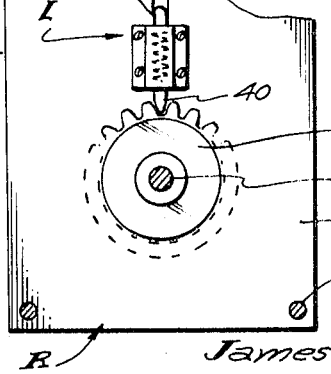

PATENTED NOV 30 1971 3,624,774
SHEET 3 OF 4
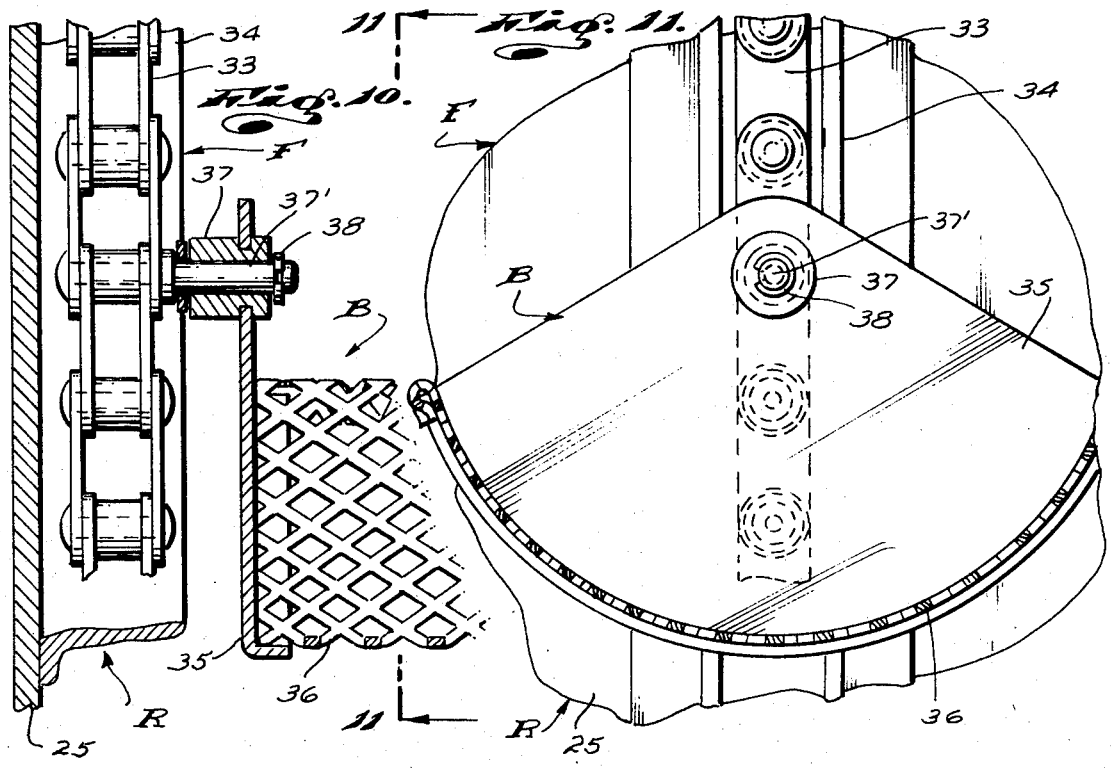
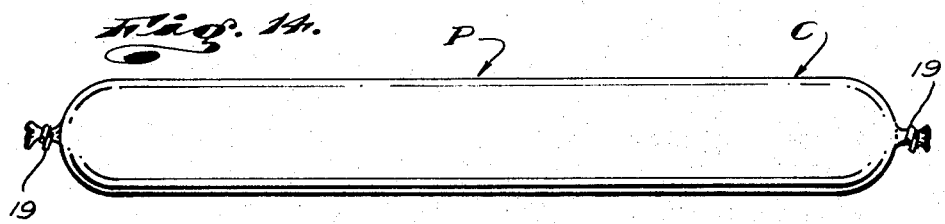
Inventor
James W. Marietta, Jr.
By George A. Truswell
Attorney Inventor
James W. Marietta Jr.
By George A. Tindwell
Attorney

SAUSAGE SMOKING APPARATUS

This invention has to do with a sausage rack and is more particularly concerned with improved means to handle or manipulate and to support sausages throughout their manufacture and smoke cooking.

In the art of manufacturing sausages, particularly large sausages, such as bologna, it is common practice to fill or stuff and to suitably tie off the sausage casings with and/or by means of old and familiar sausage stuffing machines, casing clipping or sealing machines and the like.

It is also common practice to provide the sealing means or closure devices at one end of such casings with hanger means in the nature of looped strings, through which a hook or hanger pole can be engaged for the purpose of hanging the sausage.

In the course of manufacturing sausages, it is extremely important that the sausages be maintained as nearly uniform in cross section, throughout their entire length, as is possible and so that when the finished product is cut up for distribution and sale, it can be determined that a piece of sausage of predetermined length will weigh a predetermined amount.

If a sausage is not of uniform cross section, a piece of predetermined length is cut from its smallest or narrowest portion and weighed, whereupon all subsequent pieces of like length cut from the sausage are presumed to be of equal weight, when, in fact, they are greater in diameter and are heavier than the first cut piece. While the above practice results in considerable loss in economic returns to manufacturer and/or distributor, such loss is not greater than the cost of individually weighing and marking each piece of the product.

So as to assure that all sausages produced are of the same diameter and to maintain their diameter or cross section uniform, a sizing ring, through which the sausage is urged when being stuffed, is related to the stuffing equipment.

While a sizing ring, such as referred to above, is quite effective when the sausage is extruded or moved horizontally from the stuffing machine and is supported on a related working surface or table top, it does not prevent subsequent shifting of the sausage stuffing in the casing, when the sausage is supported by the hanger engaging loop at one end, to depend vertically therefrom.

It is common practice to smoke cook sausages and the equipment or means employed to do so includes a large smoke room, in the nature of a low temperature walk-in oven, with access doors and having overhead tracks, suspended from its ceiling and which extend out of the room to the sausage stuffing area or facilities. A plurality of sausage trees, each rollingly supported by the tracks by means of wheeled trucks are provided to support the sausages and to transport them into and out of the smoking or cooking room. The trees consist of vertical columns depending from the trucks and having horizontal, outwardly projecting branches on and from which the sausages are hung by means of the hanger loops at their ends.

In the course of making sausages it is necessary that manual labor be employed to pick up the sausages at the stuffing facilities and that the sausages be carefully inverted to a vertical position, without buckling the still soft and flexible product and to thereupon engage and slide the hanger loop or string over an appropriate branch of a sausage tree, such as referred to above. Care must also be exercised so that sufficient space between adjacent sausages is maintained so that the sausages will not swing or otherwise move into contact with each other, when cooking or subsequent to being cooked and while they are still hot, as such contact results in rupturing and splitting of their casings.

Large bolognas are frequently made as much as 5 feet long, 4 inches in diameter and weighing in excess of 30 pounds. Such bolognas must be smoke cooked more than 7 hours. Considering that the casing of such a product is flexible and pliable membrane with considerable elasticity and that the stuffing, before being cooked, is a fluid slurry or emulsion, it will be apparent that it is inevitable that the column of stuffing will tend to settle and move downwardly in the casing as soon as it is hung from a sausage tree and the weight of the column of stuffing and the above-noted downward movement of said stuffing in the casing will cause the lower end of the casing to distend and the upper end thereof to contract a proportionate amount. As a result of the above, such sausage products are seldom, if ever, of uniform cross section, as is desired.

In addition to the above there is a tendency for the fats in the stuffing to melt and to migrate downwardly while the sausages are being cooked, the practice of hanging sausages vertically when being cooked frequently results in the lower portion of the finished product having a greater fat content than the upper portion thereof. This results in a product which is not uniform and is not desirable.

In some cases, certain sausages are provided with a secondary casing of high tensile film having little or no elasticity, to prevent them from becoming misshaped when hung for cooking. While such secondary casings serve their intended purpose, they are costly and also prevent the product from effectively absorbing and taking on the flavor of the smoke. Accordingly, the use of such secondary casing is not desirable under any circumstances from an economic standpoint and is only suitable for nonsmoke cooked products.

An object of my invention is to provide novel means and apparatus for handling and smoke cooking sausage products, which means and apparatus eliminates a major part of the manual handling of such products, which is required in carrying out the process of manufacturing sausages with existing means and apparatus.

It is another object of my invention to provide means and apparatus of the character referred to which is such that the cross section of the sausage product being worked upon and cooked remains uniform through the longitudinal extent of the product and the tendency for the fats to flow and result in a nonuniform product is substantially eliminated.

It is an object of my invention to provide means and apparatus of the character referred to which is such that at least one-third more product can be advantageously supported, for cooking, in a given space than is possible with use of conventional sausage trees of the character referred to above and which is such that the possibility of sausages coming into contact with each other, with resulting rupturing of their casing, while cooking and while still hot, is eliminated.

An object and feature of my invention is to provide a sausage rack for engagement with and suspension from an overhead track engaging truck and having a plurality of elongate, horizontally extending, upwardly opening sausage supporting cradlelike baskets.

A further object and feature of my invention is to provide a rack of the character referred to above wherein the plurality of baskets are pivotally supported at their opposite ends by vertically extending endless belts, cables or link chains at opposite ends of the rack, whereby the cradles can be moved vertically up and down within the rack to facilitate loading and unloading the cradles with sausages and to permit rocking of the cradles to facilitate engagement and disengagement of sausages therein and to prevent the displacement of the sausages from engagement thereon as a result of movement or jarring of the rack.

It is an object of my invention to provide baskets of the character referred to established of open mesh material whereby the surfaces of the sausages adjacent thereto are not shielded from smoke so as to prevent or interfere with smoke cooking of the sausages and to provide such baskets which are made of or coated with a nonheat conducting, nonsticking material whereby the sausages supported thereby are not subject to being burned by or sticking to the baskets with resulting damage thereto.

It is a further object of this invention to provide a rack structure having a frame which is lightweight and which is such that it effectively guards the baskets within its confines and products carried thereby from being struck, upset or damaged by other like adjacent racks and other structure in and throughout the areas in which the rack is used.

An object of my invention is to provide novel loading means adapted to be related to sausage stuffing and casing sealing equipment and with my novel rack structure to automatically deliver sausages from said equipment to the rack and to effect loading of the rack.

It is another object to provide novel means for unloading sausages from my new rack construction.

The various objects and features set forth above and other objects and features provided by the instant invention will be fully understood from the following detailed description of a typical preferred form and application of my invention, throughout which description reference is made to the accompanying drawings, in which:

FIG. 1 is an isometric view of a conventional sausage-stuffing apparatus;

FIG. 2 is an elevational view of a typical, finished sausage product;

FIG. 3 is an isometric view of the rack construction that I provide;

FIG. 4 is a sectional view taken substantially as indicated by line 4—4 on FIG. 3;

FIG. 5 is a sectional view taken substantially as indicated by line 5—5 on FIG. 3;

FIG. 6 is a sectional view taken substantially as indicated by line 6—6 on FIG.

FIG. 7 is a sectional view taken substantially as indicated by line 7—7 on FIG. 4;

FIG. 8 is a sectional view taken substantially as indicated by line 8—8 on FIG. 3;

FIG. 9 is a sectional view taken substantially as indicated by line 9—9 on FIG. 8;

FIG. 10 is a sectional view taken substantially as indicated by line 10—10 on FIG. 3;

FIG. 11 is a sectional view taken substantially as indicated by line 11—11 on FIG. 10;

Figure 12:
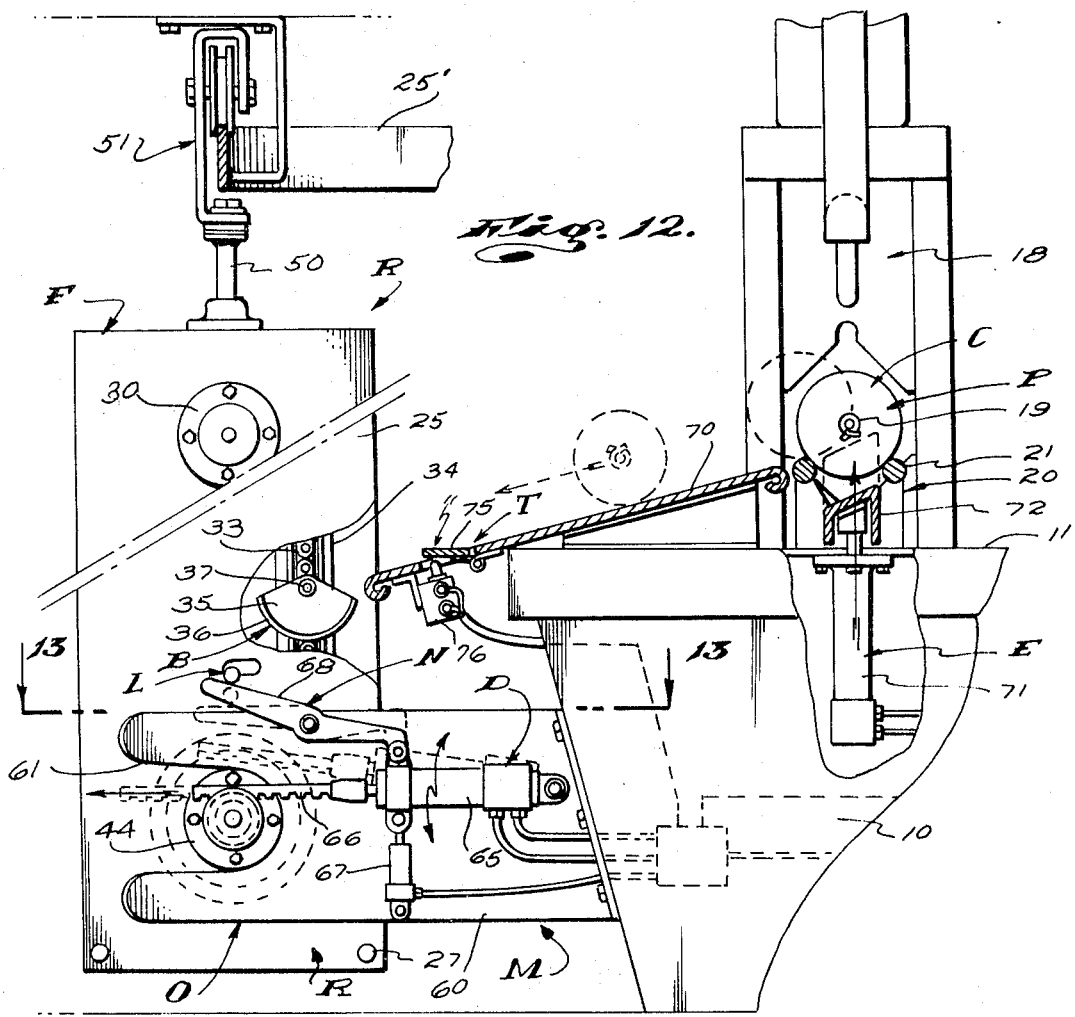
FIG. 12 is an elevational view of my new apparatus with portions broken away to better illustrate the details of the construction.

In FIG. 1 of the drawings I have illustrated a typical or conventional sausage-stuffing apparatus and a related sausage-hanging tree.

The apparatus is shown as including an elongate tube 10 with front and rear ends and a flat top 11. A motor driven auger type stuffer 12 with a hopper 13 and an elongate, horizontal, forwardly projecting, tubular neck 14 is mounted on the rear portion of the table top 11. The hopper 13 is adapted to receive a slurry of raw sausage filling. The neck 14 is adapted to slidably receive an elongate, tubular casing C of flexible plastic film and sealed at its front end by a cap 15 with a looped hanger string 16 related thereto. The stuffer urges the slurry forwardly from the hopper, through the neck and into the casing to draw the casing from the neck as the casing is progressively filled and the product is established.

A dielike sausage sizer 17 is mounted forward of the neck, in axial alignment therewith. The stuffed casing is urged through the sizer as it advances forwardly from the neck and is effectively urged into predetermined, uniform cross section by the sizer as it advances forwardly therethrough.

Forward of the sizer 17 and supported by the table top 11 is a garreting type clipping device or machine 18 adapted to normally freely receive and pass the forwardly moving stuffed casing as it leaves the sizer and adapted, when actuated, to close about the product to gather and seal the rear end portion of the casing C and to simultaneously apply an encircling metal staplelike sealing clip 19 to and about the gathered casing.

Spaced forward of the clipping device is a sausage support 20 including a pair of elongate horizontal laterally spaced rails 21 to slidably receive the sausage as it advances forwardly from the clipping device and to support the sausage preparatory to its being manually lifted, turned and hung on an arm 22 of a sausage tree 23, by means of the string 16.

The sausage tree is carried by and depends from a wheeled truck 24 which truck is rollingly engaged with and operable longitudinally of an overhead, normally ceiling mounted rail 25 of a rail system which extends from the sausage stuffing apparatus to an appropriate remote oven or smoke house (not shown).

The apparatus shown in FIG. 1 and described above is not novel and is well known and familiar to those skilled in the art, and, accordingly, further detailed description of the structure involved and/or the operation or function of the apparatus would only tend to unduly burden this disclosure and will therefore be dispensed with.

FIG. 2 is an elevational view showing a typical sausage product P suspended by its string 16, from an arm 22 of a sausage tree. FIG. 2 illustrates the manner in which a sausage can and frequently does become misshaped when hung or suspended, when raw and during its cooking period. It will be noted that, as a result of the weight of the column of the raw fluid filling, the lower end of the casing C has stretched or distended and is larger than the upper end of the casing.

Further, in FIG. 2 of the drawings and as indicated by the reference character Z, fats and oils melted during the cooking of the sausage migrate downwardly and tend to concentrate in the lower portion of the vertically hung sausage, with the result that the lower portion has a greater fat content than the upper portion thereof and the finished product is not only other than uniform as to size, but is not uniform as to character and/or quality from one of its ends to the other.

The present invention seeks to attain two primary or principal ends: first, to assure the producing of a sausage product which is uniform in size and in quality throughout its longitudinal extent and, second, to better and more effectively use available space, whereby a material increase in sausage production can be attained in a given time period, utilizing existing ovens or smoke houses and utilizing the major portion of existing sausage stuffing apparatus. These ends are gained by providing and utilizing a novel sausage rack construction R in place of the old, conventional sausage tree constructions, for receiving and supporting sausages from that stage of manufacture when the sausage casings are stuffed with raw filler and throughout the cooking period of the sausages.

Figure 13:
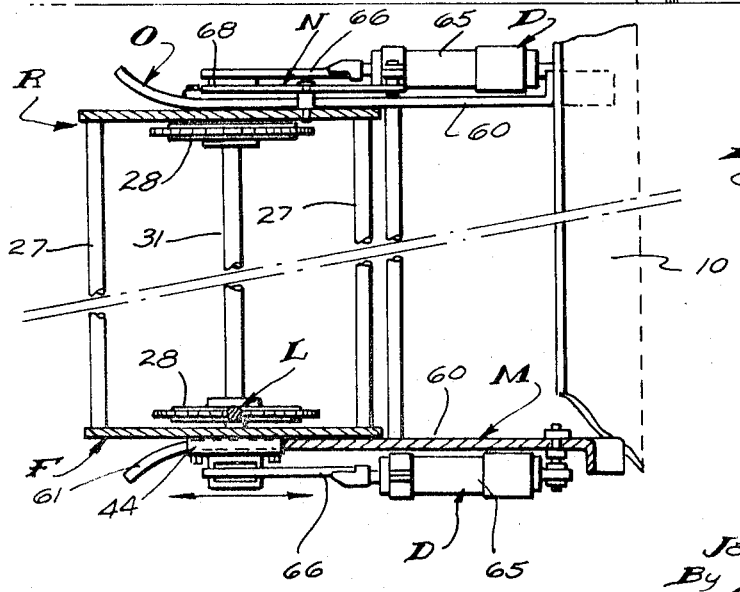
FIG. 13 is a sectional view taken substantially as indicated by line 13—13 on FIG. 1; and, FIG. 14 is an elevational view of a finished sausage produced with the means and apparatus that I provide.

The rack construction R, shown in FIGS. 3 through 13 of the drawings, is adapted to receive and support sausages horizontally and includes, generally, a frame F and a plurality of elongate, horizontally extending, upwardly opening sausage baskets or cradles B supported within the frame F.

The frame F is an elongate rectangular structure arranged in a vertical plane and including longitudinally spaced, vertical end walls 25, a horizontal top wall 26, bottom spreaders 27 and laterally opening sides.

The frame F can vary widely in construction without departing from the spirit of this invention. For example, the ends and the top of the frame can be fabricated of angle, channel or tube stock and need not be established of sheet or plate stock as is illustrated.

At each end of the frame, within the confines thereof is a pair of vertically spaced sprockets rotatably supported in the frame on horizontal axes on the central vertical plane of the frame. Each pair of sprockets includes an upper sprocket 27 and a lower sprocket 28.

In the case illustrated the upper sprockets are carried by a common upper axle 29 extending longitudinally in the frame and rotatably supported at its opposite ends in bearings 30 suitably fixed to the upper portions of the end walls 25 and the lower sprockets are carried by a common lower axle 31 extending longitudinally in the frame and rotatably supported at its opposite ends in bearings 32 fixed to the lower portions of the end walls 25.

Each pair of sprockets 28 and 27 is engaged by and with an endless link chain 33 which occurs on a plane normal to the central longitudinal plane of the frame and adjacent the inner surface of its related end wall.

In the preferred carrying out of the invention the vertical portions of the chains are guided and restrained from excess lateral movement in the frame F. In the case illustrated, guide means are provided for the vertical portions of the chains which guide means includes pairs of elongate, vertical, laterally spaced, parallel flanges 34 on the inner surfaces of the end walls 25 adjacent each vertically extending chain portion and defining a longitudinally inwardly opening, vertically extending guide channel in which the said chain portions extend. The flanges 34 are shown established by angle iron stock fixed to the walls 25 as by welding.

The sausage baskets or cradles B are elongate, horizontally and longitudinally extending basket- and/or cradlelike units with vertical end walls 35 and a longitudinally extending lower support wall 36, U-shaped or V-shaped in cross section, fixed to and extending between the end walls, and defining a longitudinally extending upwardly opening sausage-receiving trough. The support wall is established of perforated sheet metal, expanded metal lath or grill stock and is coated with a nonheat conducting, nonsticking coating, such as a coating of polyvinyl chloride.

In practice the support walls 36 can be reinforced and stiffened by means of longitudinally extending rods along the longitudinal edges of said walls and about which the edge portions of the walls are formed or to which the edge portions of said walls are suitably secured or fixed.

In practice, if the baskets B are to support sausages 4 inches in diameter, such as large bolognas, the support walls are preferably formed with a 4-inch radius and are less than 180° and greater than 90° in circumferential extent so that the lower portions of the sausages engaged therein are uniformly supported about at least 90° of their lower sides and in such a manner that their cross-sectional configuration is not disturbed, so that they are not subject to rolling, sliding or shifting laterally from seated, supported engagement in the baskets. For sausages of smaller diameter, smaller diameter baskets can be provided.

If desired, the support wall can be V-shaped in cross section without departing from the spirit of this invention and in which case sausages of different diameters engaged therein are supported at and along lines on their opposite lower quarters and in such a manner that their cross-sectional shape would be little affected and would remain uniform throughout their longitudinal extent.

The end walls 35 of the baskets B project upwardly above the upper edges of the support walls and above the anticipated axes of the sausages to be engaged in the baskets and are provided with bearings 37 on the central vertical planes of the baskets and in which laterally inwardly projecting support pins 37', carried by the link chains 33 are slidably and rotatably engaged. The pins 37' and bearings 37 are prevented from becoming disengaged by suitable snapring retaining means 38.

The support pins 37' are established by those special link chain connecting pins with laterally projecting pins or shafts commonly provided for use in structures such as here provided.

With the structure thus far described, it will be apparent that the plurality of baskets B are supported by and extend between the chains 33 and are supported on horizontal axes wholly within the confines of the frame F.

The longitudinal and the vertical extent of the frame F and the longitudinal extent of the baskets B can vary widely as circumstances require. It is presently anticipated that baskets about 64 inches long and with support walls 36 with 4-inch radii will be the maximum size of the baskets since it is believed that 60-inch long, 4-inch diameter bolognas are the largest regularly and commercially produced sausages and baskets of the above-suggested size would most effectively support and carry such sausages.

The frame F in such a case would have to be sufficiently long to accommodate baskets of such length.

The vertical extent of the frame and the resulting number of baskets that can be supported therein is subject to wide variation. In one preferred carrying out of the invention, the baskets B are spaced 6-inches apart along the chains 33 and there are 20 baskets, there normally being nine baskets along the vertical portions of the chains 33 and one basket at the top or uppermost and one basket at the bottom or lowermost portions of the chains, on the central vertical plane of the frame and where the chains extend over their related sprockets. In such a case, it will be noted that the frame F would be close to 65 inches in vertical extent in order to properly accommodate the structure carried within its confines.

The lateral extent of the frame is variable and must be made sufficiently wide to assure running clearance between the two laterally spaced vertical rows of baskets and the sausages therein. Considering the largest size of sausage is 4 inches in diameter and affording two clearance between the vertical rows of sausages and establishing the frame so that the sausages are spaced laterally inwardly 1 inch from their adjacent sides of the frame, the maximum width of the frame need not exceed 12 inches.

It has been determined that a rack R adapted to hold 20, 4-inch-in-diameter sausages requires 30 percent less space than is required to hang 20 similar sausages on conventional sausage trees.

It will be apparent that the baskets B being carried by the chains 33, which chains are engaged on and about the products, are movable vertically up and down and about the interior of the frame and in such a manner that they can be moved to facilitate loading and unloading the rack, as will hereinafter be described and so that the baskets can be moved to facilitate checking or examining the sausages engaged therein and to change their position and elevation during their cooking period, if desired or necessary.

When the rack is fully loaded and when it is empty, the chain connected baskets are balanced. When sausages are, one at a time, loaded into or removed from the rack, the weight of the load is varied and the load shifts to equalize itself and so that an equal number of sausages occur at each side of the rack. Such an action greatly facilitates manual loading and unloading of the rack and only requires manually advancing the baskets a short distance to load the last and uppermost sausage of a full load or to unload the last and lowermost sausage when unloading.

In practice and to prevent undesired movement or rotation of the baskets so as to make loading and unloading more convenient and practical, I provide a manually operable latch means L at one end of the frame F and engageable with a sprocket to releasably engage and to normally prevent rotation of the sprocket and corresponding rotation of the baskets.

In the case illustrated, the latch means L is curved by an end wall 25 above the lower sprocket 28 related thereto and includes a vertically shiftable spring-loaded bolt 40 mounted on the inner side of the end wall and normally urged downwardly into locking engagement with the sprocket and having a longitudinally outwardly projecting manually engageable pinlike handle 41 projecting through a slotlike opening 42 in the end wall and accessible at the exterior of the frame. By manually urging the handle upwardly, the bolt releases the sprocket 28 and the baskets are free to be rotated within the frame.

The slot opening 42 is provided with a lateral extension at its upper end into which the handle can be turned to hold the bolt disengaged from the sprocket.

The bearings 33 rotatably supporting the ends of the lower axle or shaft 31 include cylindrical flangelike bases 44 fixed to and projecting longitudinally outwardly from the end walls 25. At least one of said bearings is provided with a longitudinally outwardly projecting extensionlike housing 45 to receive an extended end of the axle 31 and to freely receive a pinion gear on the axle. The housing has an upwardly opening access opening 47 to provide access to the gear and to effect driving the construction to rotate the baskets, as will hereinafter be described.

Finally, the rack includes support means H, which means is preferably in the form of a hanger means to support the construction from the overhead tracks in a packing house nor-